United States Patent
Pean et al.

(10) Patent No.: US 9,734,102 B2
(45) Date of Patent: Aug. 15, 2017

(54) DATA TRANSFER

(71) Applicant: Atmel Corporation, San Jose, CA (US)

(72) Inventors: Guillaume Pean, Aix en Provence (FR); Renaud Tiennot, Aix en Provence (FR); Vincent Debout, La Ciotat (FR)

(73) Assignee: Atmel Corporation, San Jose, CA (US)

( * ) Notice: Subject to any disclaimer, the term of this patent is extended or adjusted under 35 U.S.C. 154(b) by 302 days.

(21) Appl. No.: 14/532,818

(22) Filed: Nov. 4, 2014

(65) Prior Publication Data
US 2016/0124878 A1    May 5, 2016

(51) Int. Cl.
G06F 3/00    (2006.01)
*G06F 13/28*    (2006.01)
*G06F 13/40*    (2006.01)
*G06F 13/42*    (2006.01)

(52) U.S. Cl.
CPC .......... *G06F 13/28* (2013.01); *G06F 13/4018* (2013.01); *G06F 13/4252* (2013.01)

(58) Field of Classification Search
None
See application file for complete search history.

(56) References Cited

U.S. PATENT DOCUMENTS

| | | | |
|---|---|---|---|
| 5,815,734 A | 9/1998 | Lee | |
| 6,457,074 B1 | 9/2002 | Gaillard | |
| 6,499,077 B1 | 12/2002 | Abramson | |
| 7,398,335 B2 * | 7/2008 | Sonksen | ................. G06F 13/28 709/232 |
| 2003/0221026 A1 | 11/2003 | Newman | |
| 2014/0089536 A1 | 3/2014 | Pedersen | |
| 2015/0161065 A1 | 6/2015 | Lunadier et al. | |
| 2015/0188562 A1 | 7/2015 | Lam | |
| 2016/0098375 A1 | 4/2016 | Pean et al. | |
| 2016/0132445 A1 | 5/2016 | Birsan et al. | |

* cited by examiner

*Primary Examiner* — Cheng-Yuan Tseng
(74) *Attorney, Agent, or Firm* — Fish & Richardson P.C.

(57) ABSTRACT

A controller coupled to a peripheral identifies an access type used by the controller for data transfer. The controller performs operations including: sending information to a peripheral coupled to a controller, the information indicating an access type for which the controller is configured for data transfer; monitoring a communication link with the peripheral for a signal indicating that the peripheral is ready to perform a data transfer according to the access type; and performing, in response to a receipt of the signal through the communication link, the data transfer using data transfer handshake signals that are adapted according to the access type.

18 Claims, 5 Drawing Sheets

DATA TRANSFER

TECHNICAL FIELD

This disclosure relates generally to initiating data transfers.

BACKGROUND

Microcontrollers can be configured to communicate with a variety of peripherals using a direct memory access (DMA) controller. DMA can allow the microcontroller to access memory on a peripheral independently of a processor of a microcontroller. This can be useful, e.g., so that the processor can initiate a data transfer, perform other operations while the data transfer is in progress, and then return to the transfer when the transfer is complete. Allowing the processor to perform other operations can improve system performance, e.g., when the processor is not keeping up with the rate of data transfer, or where it is useful for the processor perform other work while waiting for a data transfer to finish.

SUMMARY

Systems, methods, circuits and computer-readable mediums for data transfer with flexible latency are disclosed. In some implementations, a controller coupled to a peripheral identifies an access type used by the controller for data transfer. The controller performs operations including: sending information to a peripheral coupled to a controller, the information indicating an access type for which the controller is configured for data transfer; monitoring a communication link with the peripheral for a signal indicating that the peripheral is ready to perform a data transfer according to the access type; and performing, in response to a receipt of the signal through the communication link, the data transfer using data transfer handshake signals that are adapted according to the access type.

In some implementations, the peripheral receives the access type from the controller for data transfer, determines if the peripheral is ready for the data transfer, signals on a communication link with the controller that the peripheral is ready to perform the data transfer according to the access type, adapts handshake signals with the controller according to the access type, and performs the data transfer according to the access type using the adapted handshake signals.

Other implementations are directed to systems, methods, circuits and computer-readable mediums.

DETAILED DESCRIPTION

Systems, methods, circuits and computer-readable mediums are disclosed for data transfer with flexible latency that use communications from a controller to a peripheral and configuration registers to adapt data transfer handshake signals to allow the controller to perform the data transfer according to specified access type with reduced latency.

In an example scenario, microcontrollers can be configured to communicate with a variety of peripherals using a direct memory access (DMA) controller. For example, transfer between the DMA controller and peripherals may involve a handshaking procedure. A peripheral sends a first signal to the DMA controller to indicate that data can be written to an input data register of the peripheral and a second signal to indicate that data can be read from an output data register of the peripheral. When a buffer in the DMA controller is storing data for transfer to a peripheral, the DMA controller will sample the first signal sent by the peripheral to determine if the first signal is active and then send the first data in the buffer to the input data register. The DMA controller will then wait for a pulse or toggle on the signal line and then send the next data in the buffer. Using this handshake procedure, data transfer using the DMA controller is autonomous but has increased latency because the DMA controller grants one memory access at a time and the handshake procedure must be performed for each memory access.

Figure 1:
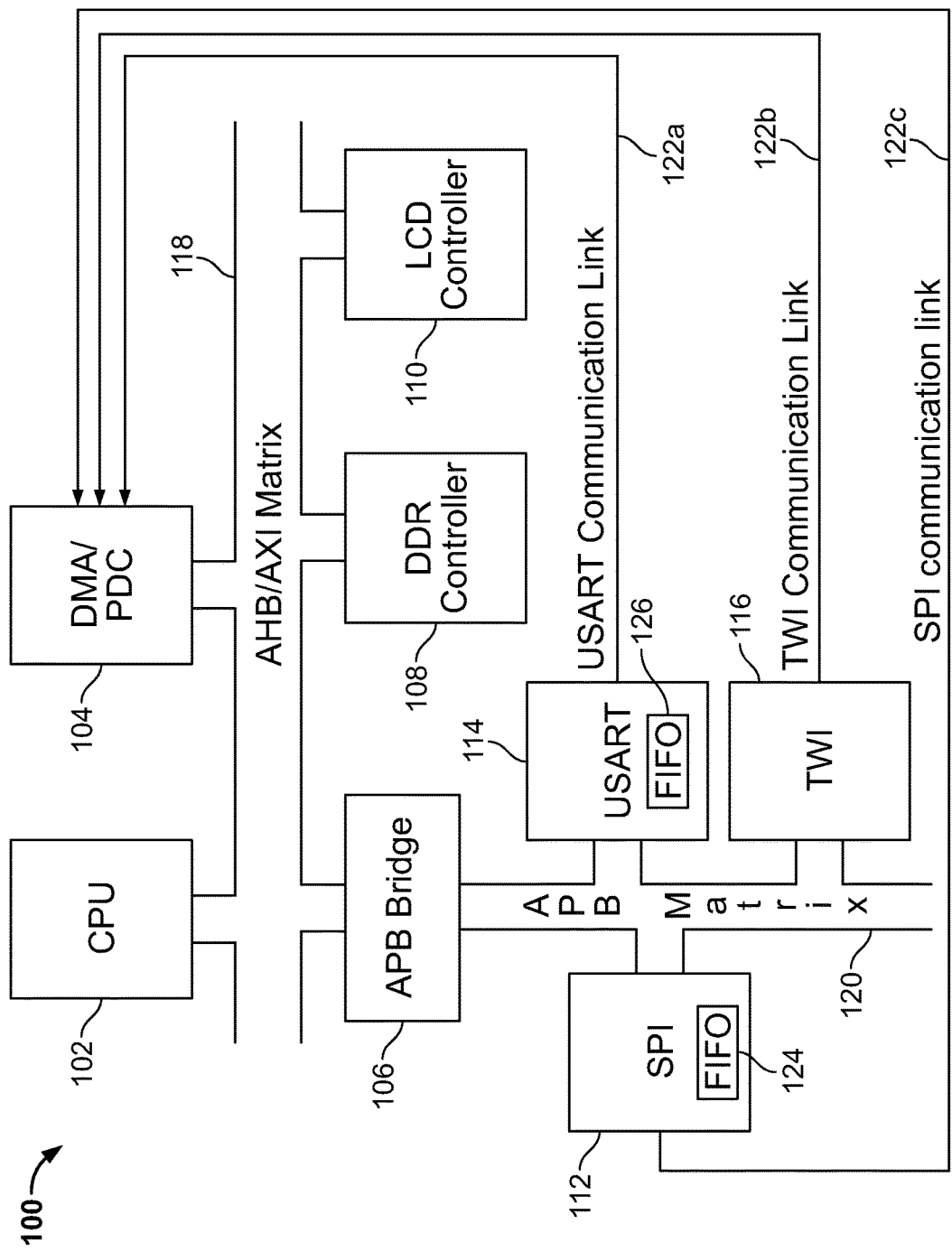
FIG. 1 is a block diagram of an example microcontroller system including data transfer with flexible latency in accordance with an embodiment.

FIG. 1 is a block diagram of an example microcontroller system 100 for data transfer with flexible latency. In some implementations, microcontroller system 100 can include central processing unit 102 (CPU), controller 104, peripheral bus bridge 106, memory controller 108, display controller 110 and peripheral interfaces 112, 114, 116. In practice, system 100 can include more or fewer components or subsystems than is shown in FIG. 1.

Controller 104 can be, for example, a direct memory access (DMA) controller or peripheral DMA controller (PDC). A DMA controller transfers data between memories and peripherals with minimal CPU intervention. While the CPU spends time in low-power sleep modes or performs other tasks, the DMA controller offloads the CPU by taking care of data copying from one area to another. A complete DMA read and write operation between memories and/or peripherals is called a DMA transaction. A transaction is performed in data blocks and the size of the transaction (number of bytes to transfer) is selectable from software and controlled by the block size and repeat counter settings.

A PDC transfers data between on-chip serial peripherals and on and/or off-chip memories. Using the PDC removes processor overhead by reducing its intervention during the transfer. This significantly reduces the number of clock cycles required for a data transfer, which improves microcontroller system performance. To launch a transfer, the peripheral triggers its associated PDC channels by using handshake signals. When the programmed data is transferred, an end of transfer interrupt is generated by the peripheral itself.

Peripheral bridge 106 can be, for example, an advanced microcontroller bus architecture (AMBA) peripheral bus (APB). Memory controller 108 can be, for example, a double data rate (DDR) memory controller used to drive DDR memory (e.g., SDRAM), where data is transferred on both rising and falling edges of the system's memory clock. Display controller 110 can be, for example a liquid crystal display (LCD) controller for running a segment of an LCD display. Peripheral interfaces 112, 116 can be, for example, a serial peripheral interface (SPI) or two-wire interface (TWI). Peripheral interface 114 can be, for example, a universal asynchronous receiver/transmitter (USART). Peripheral interfaces 112, 114, 116 can be coupled to system bus 118 through peripheral bridge 106 and peripheral bus 120. System bus 118 can be, for example, an AMBA high-performance bus (AHB) or bus matrix (AXI). Peripheral bus 120 can be, for example, an APB bus matrix.

In some implementations, peripherals 112, 114, 116 each have a physically separate communication link 122a-122c (each physically separate and independent of the system bus channels) to controller 104 that allows each of peripherals 112, 114, 116 to communicate directly with controller 104. In some implementations, one or more peripherals 112, 114, 116 can include a transaction queue for storing read/write transaction data for the peripheral. For example, peripheral 114 (e.g., a USART) can include a First-In-First-Out (FIFO) transaction queue 126 that stores transaction data in the order the transaction data are received, as described in reference to FIG. 2. Likewise, peripheral 112 (e.g., an SPI) can include FIFO 124 for storing read/write transaction data.

In some implementations, communication links 122a-122c are configured to send advance (before data transfer) information to controller 104 that includes peripheral state information, activity reports, QoS estimates and/or any other information that can be used by controller 104 to optimize accesses to system bus 118 in terms of bandwidth, data transfer priority and QoS. In some implementations, one or more of communication links 122a-122c can be a fixed-width bus. The advance information can be encoded and sent on the bus using a predefined protocol. Controller 104 can use the advance information received on communication links 122a-122c to perform a number of optimizations, including but not limited to grouping transactions, dynamically assigning transfer priority levels and appropriate QoS information to active data channels and dynamic burst adaptation. For example, controller 104 can determine the data transfer size and length of a bus access or change a channel arbitration strategy to give a data channel more or full bandwidth for a period of time to avoid an application crash or system failure.

Figure 2:
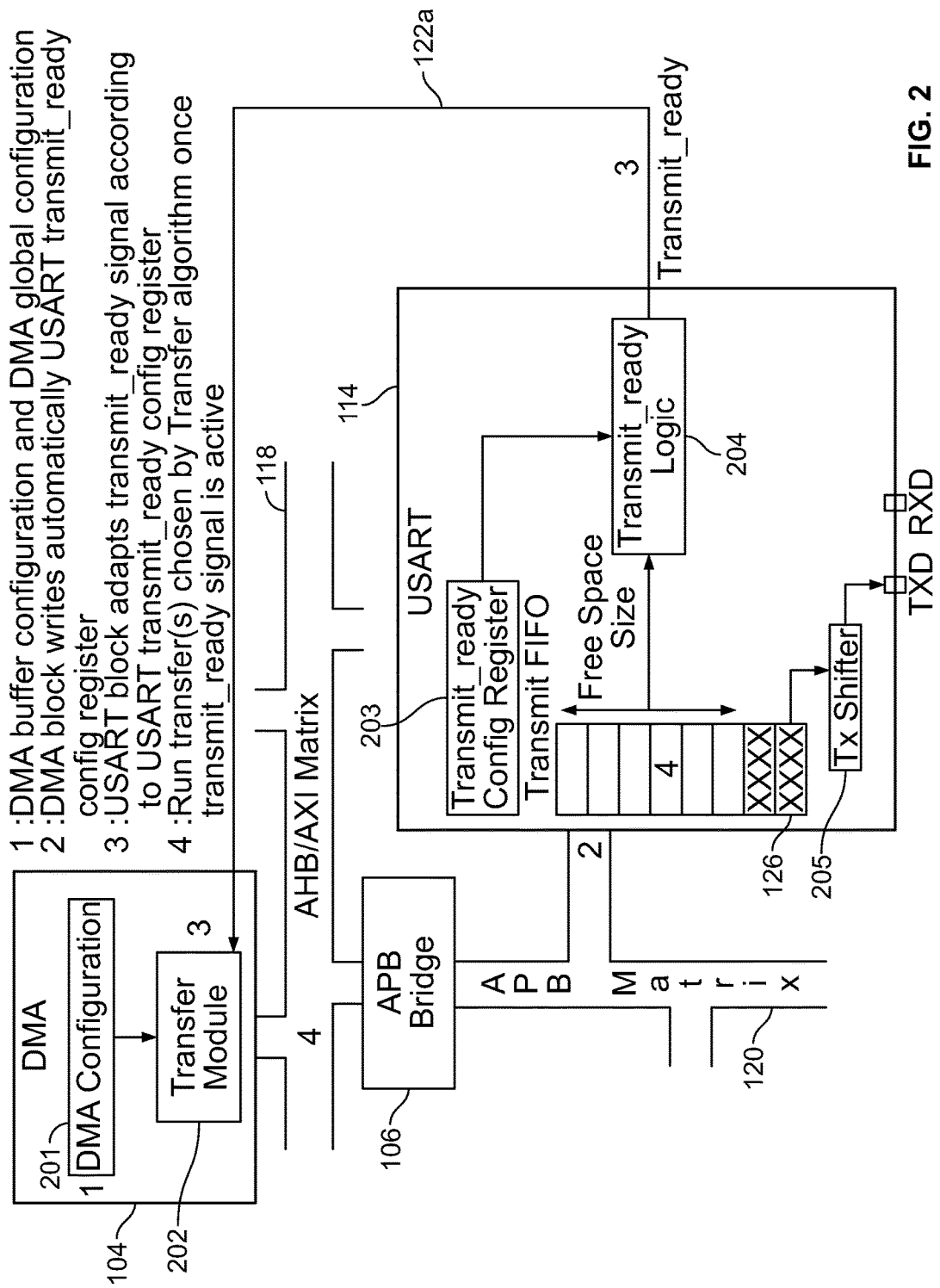
FIG. 2 is a block diagram illustrating an example autonomous data transfer with flexible latency in accordance with an embodiment.

FIG. 2 is a block diagram illustrating data transfer with flexible latency. FIG. 2 includes numbers 1-4 designating controller events during data transfer. The controller events need not be executed in the sequence shown and some events may be performed in parallel. In some implementations, controller 104 includes controller register 201 and transfer module 202. Peripheral 115 includes peripheral register 203 and logic 204. The operation of system 100 is described below using an example application where a 64-word data buffer in controller 104 (not shown) is to be transferred to a 16-word transaction queue 126 (FIFO) in peripheral 114. Thus, 64-words of data are to be transferred but there is only enough free space in transaction queue 126 for 16-words of data. In this example, peripheral 114 is a USART.

In some implementations, during controller event 1 the transfer process begins by programming register 201 in controller 104 with buffer and global configuration data. Some examples of global configuration include but are not limited to: peripheral identifier, source and destination addressing mode, optional master port identifier, data width, chunk size, optional software request command, protection information for secure content, memory burst size and synchronization type, buffer length, buffer transfer multiplier. This data are programmed using register write operations or using a list of transfer descriptors to allow transfer chaining.

During controller event 2, before starting the data transfer controller 104 issues a bus write access (e.g., APB write access) to peripheral register 203 to provide peripheral 114 with information about the 64-word data buffer and configuration of controller 104. Information can include but is not limited to buffer and/or controller configuration information (e.g., buffer data size) and burst size configuration (e.g., single, 4 words, 8 words, 16 words). In some implementations, controller 104 can issue a bus write access for each new burst transfer. In some implementations, controller 104 can issue a bus write access for each new burst transfer only if the buffer/controller configuration has changed since the previous burst transfer.

In some implementations, logic 204 in peripheral 114 uses the information and status data (e.g., free space size) from 16-word data transaction queue 126 (e.g., 16-word FIFO queue) to adapt the behavior of handshake signals, such as transmit_ready and read_ready signals, so that controller 104 will send the 16-word data using an optimal burst size and without using handshake signals for each beat of the burst transfer. For example, the transmit_ready signal can be adapted by logic 204 according to the contents of register 203 to indicate to controller 104 that a 16-beat burst transfer can be absorbed by transaction queue 126. In some implementations, during controller event 3 the adapted transmit_ready signal can be sent on communication link 122a to controller 104, where it can be processed by transfer module 202. For example, transfer module 202 can define the burst size configuration using information about the state of the system, including but not limited to: bandwidth usage, peripheral transaction queue size, controller buffer length and the number of active controller channels. In some implementations, information about transaction queue 126 can be sent to controller 104 on a communication link prior to data transfer.

During controller event 4, in response to the adapted transmit_ready signal, transfer module 202 configures controller 104 to send 64-word data to peripheral 114 in 16-beat data bursts (e.g., 4 bursts) without using handshake signals for each word of the 64-word data. When the burst transfer is completed, controller 104 monitors the transmit_ready signal to determine when to perform the next burst transfer and so on until the entire contents of the controller data buffer is transferred to peripheral 114.

The implementation described above provides dynamic burst adaptation for data transfer in a microcontroller system that allows a peripheral to indicate when it needs to be accessed so a controller (e.g., DMA controller) can dynamically adjust access burst size. For example, a DMA controller can start to configure an SPI burst size to 16-beat bursts (assuming the SPI has a 16-word FIFO).

If implemented in a System-On-Chip (SoC), DMA data transfers to peripherals can be performed without using handshake signals, without requiring any user action and with optimized bandwidth usage and low latency. Additionally, the implementations can use existing protocols and bus architectures (e.g., APB bus) so that no additional risk is introduced and its implementation does not make the design more complex.

Figure 3:
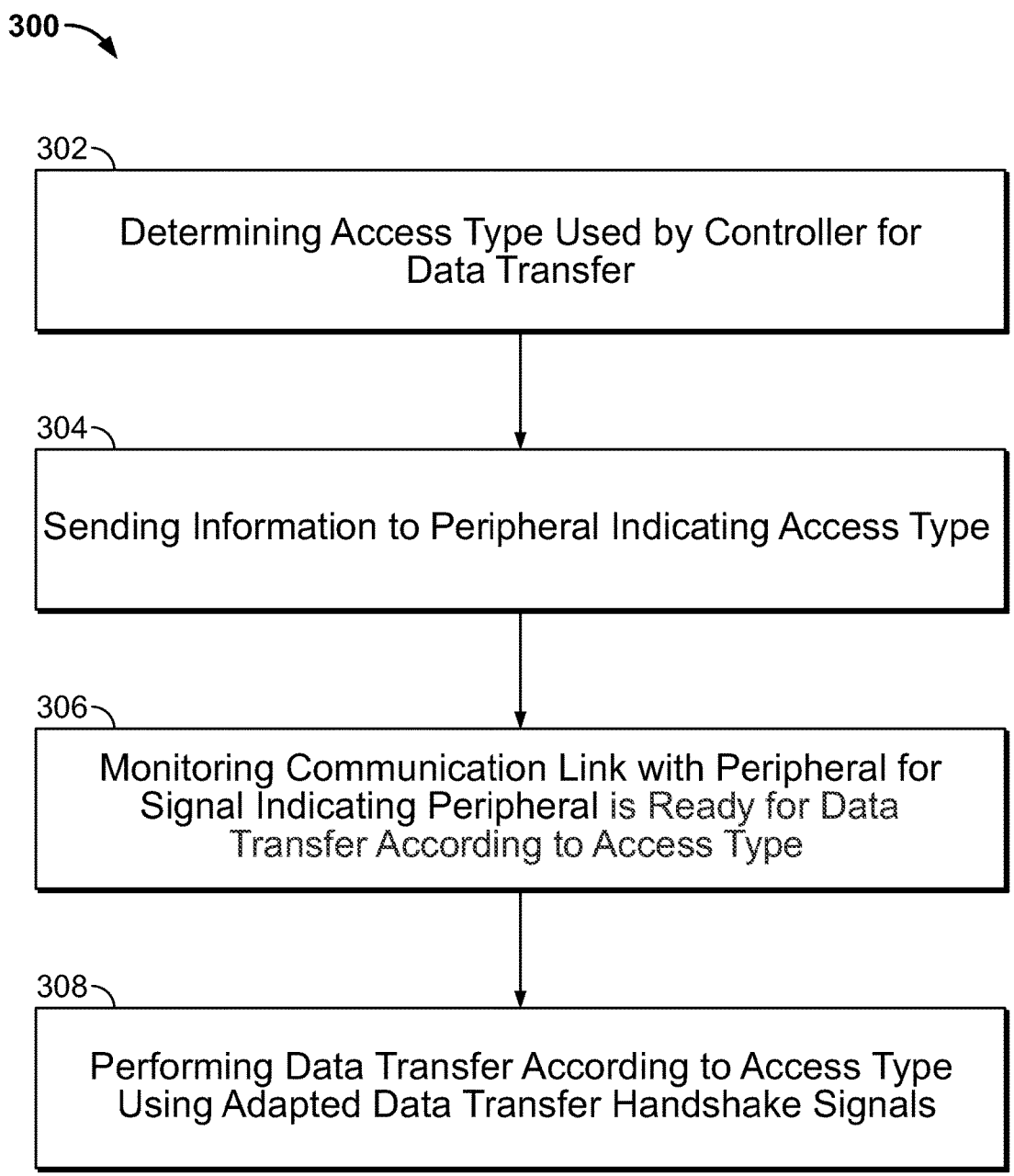
FIG. 3 is a flow diagram of an example process implemented by a controller for data transfer with flexible latency in accordance with an embodiment.

FIG. 3 is a flow diagram of an example process 300 implemented by a controller for data transfer with flexible latency. Process 300 can be implemented in a microcontroller system using software, hardware or a combination of software and hardware.

Process 300 can begin by determining an access type used by the controller for data transfer (302) and sending, prior to the data transfer, information to the peripheral indicating the access type (304). For example, a controller can determine an access type from the contents of a programmable register in the controller and other data, such as bandwidth usage, the size of the transaction queue (FIFO) in the peripheral, controller buffer size, number of controller channels and any other information that is available to the controller that can be used to determine access type. In some implementations, the information indicates a burst access type and a burst data size, where the burst size can be selected by the controller based on the amount of data to be transferred (e.g., the amount of data in the controller buffer) and the size of a transaction queue (FIFO) in the peripheral. The information can be sent over existing interfaces (no need to introduce a new interface) as part of a system bus write access request to a configuration register in the peripheral.

Process 300 can continue by monitoring a communication link with the peripheral for a signal indicating that the peripheral is ready to perform the data transfer according to the access type (306), and when the signal indicates that the peripheral is ready to perform the data transfer, performing, using adapted data transfer handshake signals with the peripheral, the data transfer according to the access type (308). In some implementations, the signal can be a binary signal (1=ready, 0=not ready) to indicate a ready or not ready state of the peripheral.

Figure 4:
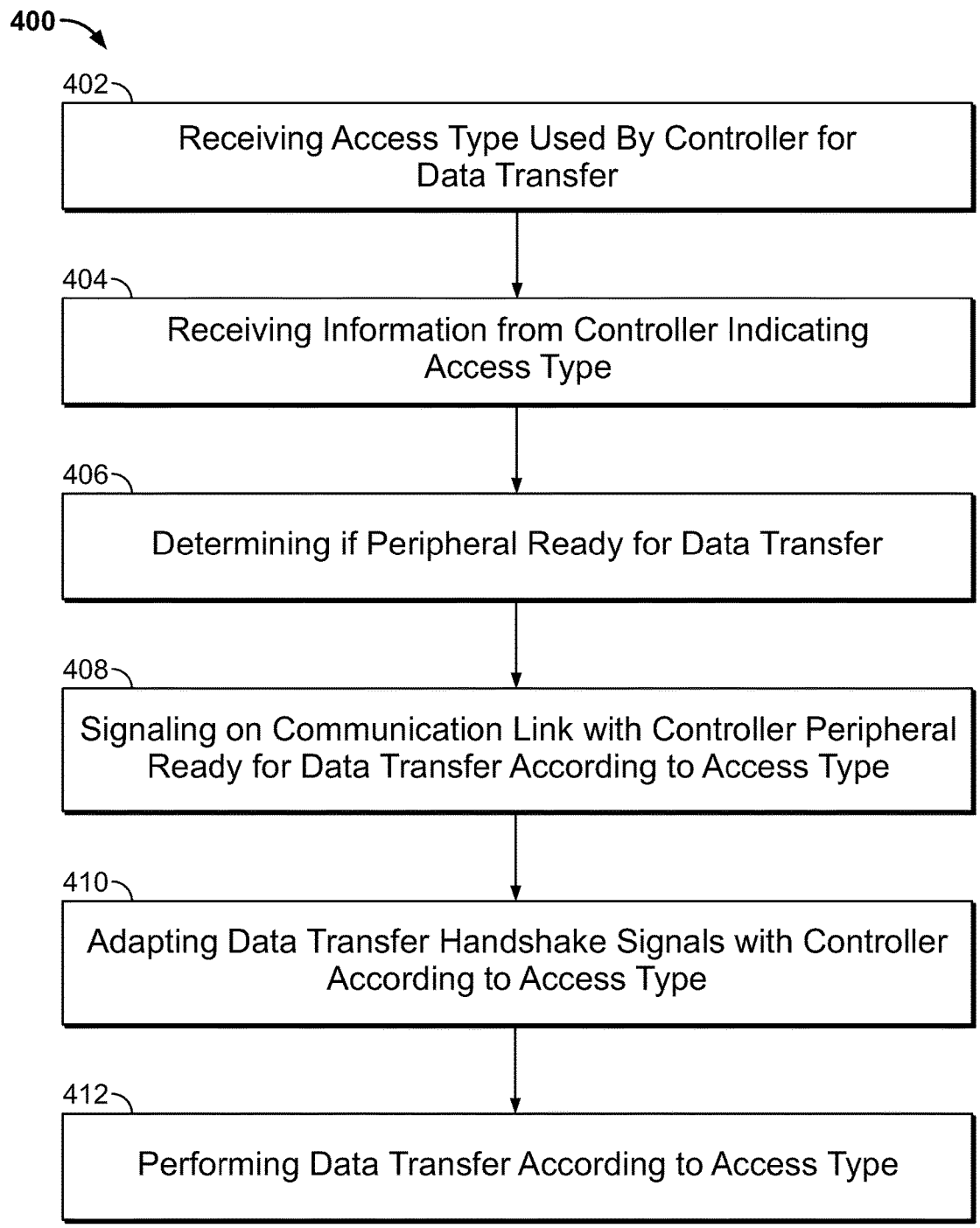
FIG. 4 is a flow diagram of an example process implemented by a peripheral for data transfer with flexible latency in accordance with an embodiment.

FIG. 4 is a flow diagram of an example process 400 implemented by a peripheral for autonomous data transfer with flexible latency. Process 400 can be implemented in a microcontroller system using software, hardware or a combination of software and hardware.

Process 400 can begin by receiving an access type used by a controller for data transfer on the bus (402). The access type and other information (e.g., controller configuration data, buffer configuration) are sent to the peripheral in a write access request to a register in the peripheral (404). Some example access types include but are not limited to single and burst access types. The burst access types can include N-word access types, where N is a power of 2 (e.g., 2 words, 4 words, 8 words, 16 words).

Process 400 can continue by determining if the peripheral is ready for the data transfer (406) and signaling on a communication link with the controller that the peripheral is ready to perform the data transfer according to the access type (408). In some implementations, the communication link can be separate and independent from the system bus used for data transfer. In some implementations, the communication link can be used to send peripheral state information to the controller to assist the controller in determining an access type, such as state of its transaction queue (e.g., free space available).

Process 400 can continue by adapting handshake signals with the controller according to the access type (410) and performing, using the adapted handshake signals, the data transfer according to the access type (412). In some implementations, the signal sent to the controller can be adapted by logic in the peripheral based on the access type. The signal can be adapted, for example, by raising the signal to indicate the peripheral is ready to perform the data transfer, holding the signal low until the data transfer is completed, and then raising the signal to indicate that the peripheral is ready to receive the next data transfer. In some implementations, the signal can be raised by logic in the peripheral after the peripheral determines that its transaction queue (FIFO) has sufficient free space to absorb the data transfer.

Figure 5:
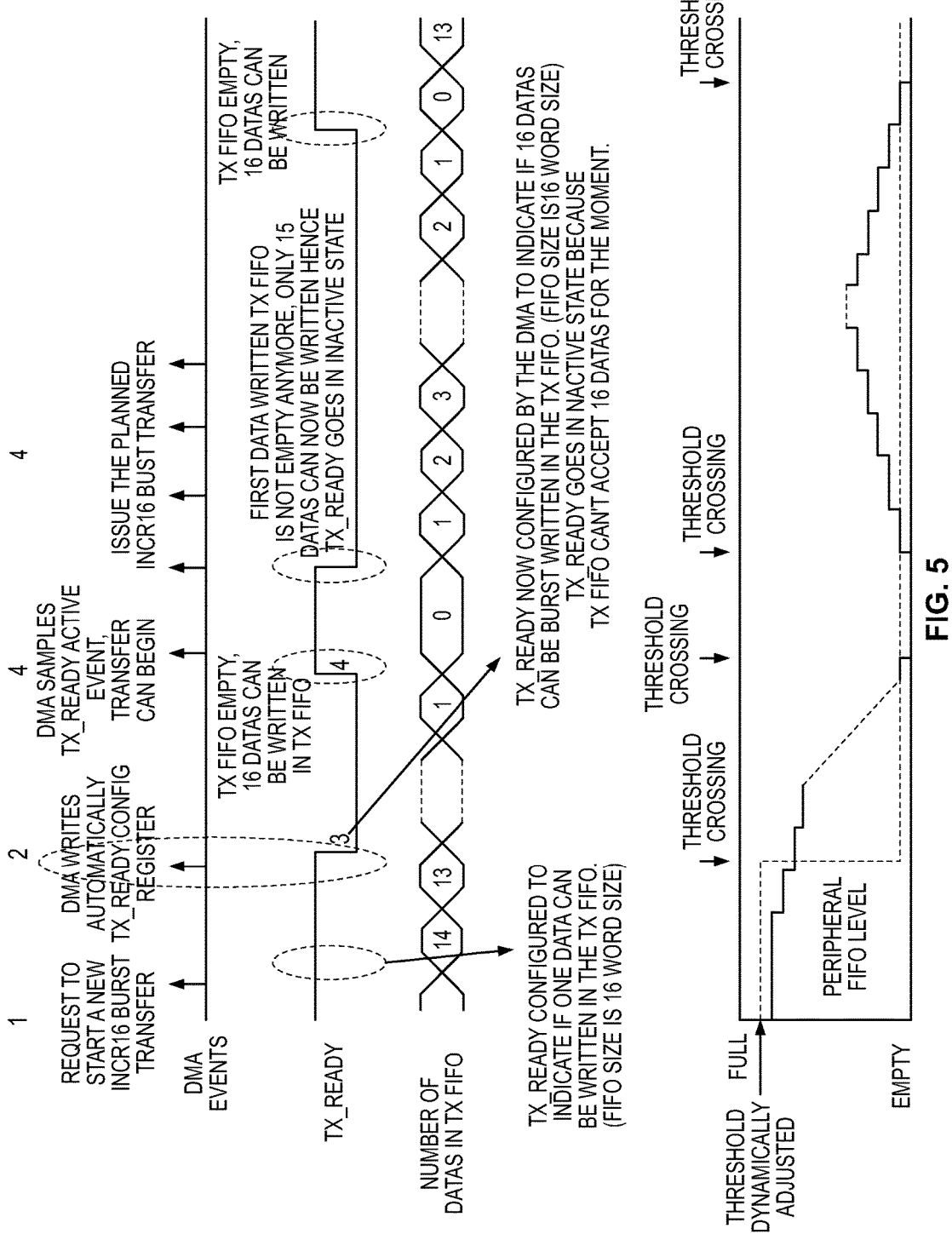
FIG. 5 includes an event diagram illustrating an example data transfer with flexible latency in accordance with an embodiment.

FIG. 5 includes 4 diagrams illustrating autonomous data transfer with flexible latency. From top to bottom, the diagrams include controller event, transmit ready signal, transaction queue (TX FIFO) state and TX FIFO threshold signal. The controller event diagram includes numbers to indicate controller events and correspond to the controller event numbers in FIG. 2. For this example, it is assumed that the size of the data transfer is 16 words (16 words stored in the DMA buffer) and the size of TX FIFO is 16 words. It is desired to do a signal burst transfer of all 16 words without using handshake signals for each beat of the burst transfer.

In some implementations, in response to controller event 1 the first controller requests to start a data transfer using a burst access type of 16 words. Initially, the transfer_ready (tx_ready) signal is active (e.g., high) indicating to the controller that one data can be written to TX FIFO. At this time there are 14 words in TX FIFO.

During controller event 2, the controller writes to a register in the peripheral to indicate an access type for the data transfer and other information related to the data transfer (e.g., controller or buffer configuration). Also, one data is transferred from the transaction queue to the network, leaving 13 words in the 16-word transaction queue. This causes the threshold indicator signal (see bottom diagram) to be dynamically adjusted (decremented by 1), indicating the free space size available in TX FIFO.

During controller event 3, the tx_ready signal is adapted by the controller (through the register) to indicate if 16 data can be burst written to TX FIFO. In this example, the tx_ready signal goes inactive (e.g., low) because TX FIFO cannot currently accept 16 words of data.

During controller event 4, all of the data in TX FIFO has been transferred to the network, resulting in the threshold signal being generated that indicates that TX FIFO is empty. At this time, the tx_ready signal is active again. The controller samples the active tx_ready signal, determines that tx_ready is active and begins a burst transfer of 16 words to TX FIFO. After a first data in the burst transfer is written to the transaction queue, tx_ready becomes inactive since TX FIFO is no longer empty. The burst transfer continues transferring the remaining 15 data words to TX FIFO with handshake signals for each beat (each word) of the burst transfer.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
   sending information to a peripheral coupled to a controller, the information indicating an access type for which the controller is configured for data transfer, where the access type is burst access, and where the information sent to the peripheral includes burst data size, the burst data size determined by the controller based at least in part on a size of a transaction queue in the peripheral used to store data for the data transfer;
monitoring a communication link with the peripheral for a signal indicating that the peripheral is ready to perform a data transfer according to the access type; and
performing, in response to a receipt of the signal through the communication link, the data transfer using data transfer handshake signals that are adapted according to the access type.

2. The method of claim 1, where the information sent to the peripheral includes controller configuration data.

3. The method of claim 1, where the burst data size is determined by the controller based at least in part on bandwidth usage.

4. The method of claim 1, where the burst data size is determined by the controller based at least in part on a size of a data buffer in the controller used to store data for the data transfer.

5. The method of claim 1, where the burst data size is determined by the controller based at least in part on a number of controller channels available for the data transfer.

6. The method of claim 1, where the data transfer is a data transfer from the controller to the peripheral.

7. The method of claim 1, where the data transfer is a data transfer from the peripheral to the controller.

8. The method of claim 1, where the information includes information from a programmable configuration register in the controller.

9. The method of claim 8, where the information is sent to the peripheral in response to a change in a data buffer of the controller or a change in the configuration of the controller.

10. A method comprising:
receiving, by a peripheral coupled to a controller, an access type used by the controller for data transfer;
receiving information from the controller indicating the access type;
determining if the peripheral is ready for the data transfer based at least in part on an amount of free space in a transaction queue of the peripheral;
signaling on a communication link with the controller that the peripheral is ready to perform the data transfer according to the access type;
adapting, by the peripheral, data transfer handshake signals according to the access type; and
performing the data transfer according to the access type using the adapted data transfer handshake signals.

11. The method of claim 10, where the access type is burst access.

12. The method of claim 11, where adapting data transfer handshake signals includes adapting logic in the peripheral to suppress the data transfer handshake signals for the duration of the burst access.

13. A system comprising:
a bus;
a peripheral coupled to the bus;
a controller coupled to the bus and to a communication link with the peripheral, the controller configured to:
determine an access type used by the controller for data transfer;
send information to the peripheral indicating the access type;
monitor the communication link with the peripheral for a signal indicating that the peripheral is ready for the data transfer based at least in part on an amount of free space in a transaction queue of the peripheral; and
in response to the signal indicating that the peripheral is ready for the data transfer, perform the data transfer according to the access type.

14. The system of claim 13, where the access type is burst access.

15. The system of claim 14, where the information sent to the peripheral includes burst data size.

16. The system of claim 13, where the controller is a direct memory access (DMA) controller.

17. The system of claim 13, further comprising a programmable register for storing data buffer or controller configuration information.

18. The system of claim 13, where the system is included in a microcontroller system.

* * * * *